(12) United States Patent
Fisher et al.

(10) Patent No.: US 7,344,245 B2
(45) Date of Patent: Mar. 18, 2008

(54) METHOD OF DESIGNING PROGRESSIVE LENSES

(75) Inventors: Scott Warren Fisher, Flagstaff Hill (AU); Saulius Raymond Varnas, Brighton (AU); Ray Steven Spratt, Petaluma, CA (US)

(73) Assignee: Carl Zeiss Vision Austraila Holdings Ltd, Lonsdale, South Australia (AU)

( * ) Notice: Subject to any disclaimer, the term of this patent is extended or adjusted under 35 U.S.C. 154(b) by 169 days.

(21) Appl. No.: 11/132,234

(22) Filed: May 19, 2005

(65) Prior Publication Data

US 2005/0270482 A1 Dec. 8, 2005

Related U.S. Application Data

(63) Continuation of application No. PCT/AU03/01555, filed on Nov. 20, 2003.

(30) Foreign Application Priority Data

Nov. 20, 2002 (AU) .............................. 2002953061

(51) Int. Cl.
*G02C 7/06* (2006.01)
*G06F 19/00* (2006.01)

(52) U.S. Cl. ..................... 351/169; 351/177; 700/97

(58) Field of Classification Search ................ 351/169, 351/177; 700/97
See application file for complete search history.

(56) References Cited

U.S. PATENT DOCUMENTS

| 5,493,350 | A | 2/1996 | Seidner |
| 5,777,719 | A | 7/1998 | Williams et al. |
| 6,090,051 | A | 7/2000 | Marshall |
| 6,817,713 | B2 | 11/2004 | Ueno |
| 6,827,443 | B2 | 12/2004 | Fisher et al. |
| 2005/0088616 | A1 | 4/2005 | Nason et al. |

FOREIGN PATENT DOCUMENTS

| GB | 2336333 | 10/1999 |
| WO | 94/12909 | 6/1994 |
| WO | 01/91994 | 12/2001 |
| WO | 03/052491 | 6/2003 |

*Primary Examiner*—Scott J. Sugarman
(74) *Attorney, Agent, or Firm*—Buchanan Ingersoll & Rooney PC

(57) ABSTRACT

A method and system for designing a progressive lens is disclosed. The method includes modifying a reference progressive lens design having a peripheral design which is suitable for a wearer and design features with known values. The modification of the reference progressive lens design provides a new progressive lens design in which at least one of the design features have been customized according to the wearer's preference. The new progressive lens design has substantially the same peripheral design as the reference progressive lens design.

35 Claims, 11 Drawing Sheets

METHOD OF DESIGNING PROGRESSIVE LENSES

FIELD OF INVENTION

The present invention relates to progressive addition lenses and in particular relates to a method of designing a progressive addition lens having design features which have been individually customised for a wearer. In a typical application, the design features which are customisable include zone size balance, eye path inset and corridor length.

BACKGROUND OF THE INVENTION

Conventional progressive addition lenses are lenses which have an upper distance portion ('the distance zone'), a lower near portion ('the near zone'), and a progressive corridor ('the intermediate zone') therebetween which provides a gradual power progression from the distance zone to the near zone without any dividing line or prismatic jump.

Generally speaking, the dispensing of a particular progressive addition lens (hereafter referred to as a 'progressive lens') to a wearer involves a dispenser selecting a progressive lens design from a range of available lens designs based on certain visual requirements of the wearer. Such visual requirements may include the personal preferences of the wearer.

The selection process may involve a dispenser (or an expert system) selecting a lens design having a peripheral design which the wearer is comfortable with and thus suitable for the wearer. However, although the selected lens may have a peripheral design which is suitable for the wearer, other features (such as the zone size balance, eye path inset, corridor length) may not be optimal for the wearer's visual requirements.

Indeed, in a selection process which involves selecting a particular progressive lens design from a range of lens designs, a lens design having a suitable peripheral design together with other design features (such as, zone size balance, eye path inset and corridor length) which are related to the requirements of the wearer may not be available.

Accordingly, it would be a significant advantage if a progressive lens design was able to be dispensed to a wearer such that the selected lens design had a suitable peripheral design as well as design features which are more closely related to the requirements of the wearer, that is, a lens design having design features which have been individually customised for a wearer.

Accordingly, it is an object of the present invention to provide a method of designing a progressive lens for a wearer which includes design features which have been customised for the wearer so that the progressive lens is suitable for the visual requirements of the wearer.

SUMMARY OF THE INVENTION

Briefly, the present invention is directed to a method of designing a progressive lens, the method including modifying a reference progressive lens design (hereafter referred to as 'the reference lens design') having a peripheral design which is suitable for a wearer and design features with known values, said modifying providing a new progressive lens design (hereafter referred to as 'the new lens design') in which at least one of the design features have been customised according to the wearer's preferences, wherein the new lens design has substantially the same peripheral design as the reference lens design.

More specifically, the present invention provides a method of designing a progressive addition lens design for a wearer, the method including the steps of:
(a) selecting a reference lens design, the reference lens design having:
  a peripheral design which is suitable for the wearer; and
  design features having a known value, the design features including zone size balance, eye path inset and corridor length;
(b) specifying the wearer's preferred value for one or more of the design features, said one or more of the design features including at least the zone size balance; and
(c) modifying the reference lens design to obtain a new lens design such that design features of the new lens design corresponding to the design features having specified wearer preferred values have substantially the same value as the respective preferred value;

wherein the peripheral design of the new lens design is substantially identical to the peripheral design of the reference lens design.

It is preferred that the modifying of the reference lens design provides a new lens design which is realisable as a progressive lens having a different shape to the reference lens design. In this respect, modifying the shape of the reference lens design modifies the location of points which are connected so as to define lines having equal power. Thus, modifying the shape of the reference lens design includes translating the positions of the points associated with a given power while substantially maintaining the connectivity between them so as to achieve the wearer's preferred value for one or more of the design features whilst permitting the peripheral design of the new lens design to be substantially identical to the peripheral design of the reference lens design.

Throughout this specification, reference to the term 'progressive lens design' is to be understood to be reference to a specification which describes the optical effect that a finished progressive lens has for the wearer when placed in front of the wearer's eyes in an as worn position. As will be appreciated, the optical effect of a particular lens design may be readily assessed by ray tracing a lens for a given prescription, object field and eye-lens configuration.

A reference lens design may be selected by calculating an optical vergence power distribution for a finished progressive lens. One way to achieve such a calculation is by computing a surface power distribution for a surface having a complex shape capable of delivering a desired optical effect in combination with another surface having a simple shape (such as a sphere).

Traditionally the surface with the complex shape has been the front surface of a progressive lens, although it may be the back surface. Of course, the combination of the complex shaped surface and the simple shaped surface may be used to derive a resultant reference progressive lens design (for example, by ray tracing), which those skilled in the art will be able to readily reproduce in any number of the front and back surface shape combinations by fixing one of the lens surfaces and solving a least squares fitting problem to the resultant progressive lens design.

As will be appreciated, the resultant progressive lens design can be reproduced very accurately for a given prescription or substantially accurately for any other prescription.

As will be appreciated, a progressive lens includes a front surface and a back surface which combine to provide a particular optical effect. In this respect, there is an infinite number of suitable front surface and back surface design combinations that may provide a particular optical effect. Thus, a progressive lens according to a particular new lens design may be realised as any suitable combination of a front surface and a rear surface. One suitable combination may be a combination of a progressive front surface and a spherical back surface. Another suitable combination may include a spherical front surface and a progressive back surface. Yet another suitable combination may include a toric front surface and a progressive surface with the toric base curve on the back surface.

Reference to the term 'peripheral design' throughout this specification is to be understood to be a reference to the distribution of one or more optical characteristics of the peripheral regions of a progressive lens design. In this respect, the optical characteristics may include surface characteristics, such as power distribution, or astigmatism distribution, or optical characteristics based on ray tracing the lens which quantify the optical performance of the peripheral regions. Such optical characteristics may include the root mean-square (RMS) power error which quantifies the peripheral blur distribution of a lens. In the context of this specification, the peripheral design is characterised by the distribution of the chosen optical characteristics within the peripheral zone but not the actual position of the zone on the lens surface relative to the fitting point of the lens. A certain amount of change in zone shape and size, resulting from the changes to the near point inset and corridor length would also not substantially alter the nature of the peripheral design.

Throughout this specification, reference to the term 'zone size balance' is to be understood to be reference to the ratio of the lens surface areas available for clear vision of objects at infinite distance to the lens surface available for viewing objects at the wearer's typical reading distance. It will be appreciated that these areas are limited by the contours of troublesome blur threshold obtainable by ray tracing a lens for the wearer's prescription and particular eye-lens configuration.

Reference to the term 'eye path inset' throughout this specification is to be understood to be reference to a horizontal distance between a vertical major reference point bisector of the distance zone and the vertical major reference point bisector of the near zone.

Reference to the term 'corridor' throughout this specification is to be understood to be reference to a channel of gradual power progression which joins the distance zone and the near zone. The corridor length is specified as the difference between the Y-coordinates of the distance reference point and near reference point on the lens surface.

In this specification, reference to the term 'distance zone' is to be understood to be reference to a designated zone located in the upper portion of the progressive lens design which is suitable for distance vision. Reference to the term 'near zone' throughout this specification is to be understood to be reference to a designated zone in the lower portion of the progressive lens design which provides near addition.

It is preferred that each lens design (that is, the reference lens design and the new lens design) specification include an electronic data file (such as a CAD file) including information (that is, data) which describes the design. Ideally, the information may be useable by a suitably programmed apparatus to construct a graphical representation of the design, such as in the form of a 'contour map' having lines which connect points on the lens surface having equal power. Thus, it is preferred that the information for a lens design includes lens geometry data which is representative of the shape of the respective lens design.

For each of the one or more design features for which a wearer's preferred value has been specified, it is preferred that the respective specified value be related to the visual requirements of a particular wearer. In this respect, the visual requirements of the wearer may be determined by analysing the intended use of the progressive lens. Such analysis may entail subjecting the wearer to an assessment for determining the wearer's visual requirements, and thus the preferred values for the one or more design features.

In terms of specifying a preferred value for the zone size balance, such an assessment may include obtaining 'lifestyle' information for the wearer and using this information to compute the relative frequency for which the wearer utilises the distance zone as compared to the near zone.

The relative frequency may be represented in terms of a score which rates the wearer according to a numerical scale which ranges from near dominant to distance dominant depending upon the wearer's visual requirements. Ideally, each score in the scale will be mapped to a particular zone size balance.

Preferably, the step of modifying the reference lens design to thereby obtain a new lens design includes a morphing process which employs a suitable coordinate system. One suitable coordinate system may include an elliptical coordinate system consisting of confocal ellipses and hyperbolas.

Throughout this specification, reference to the term 'morphing' is to be understood to be reference to a process which includes distorting a reference lens design so as to provide the new lens design.

It is preferred that the morphing process be accomplished by applying a suitable morphing function to the reference lens design to thereby modify the progressive surface power distribution of the reference lens design according to the wearer's preferred values. That is, the morphing process will preferably modify the positions of points having a defined equal power on the surface of the reference lens while substantially maintaining the 'connections' between those points to preserve the character of the peripheral design.

It is preferred that modifying the reference lens design be performed using a different morphing function for each of the one or more design features having a specified wearer preferred value and which are to be customised. Thus, in this form of the invention, modifying the reference lens design may include a multistage morphing process.

In terms of modifying the reference lens design to obtain a new lens design having the wearer's preferred zone size balance, the application of the morphing function may result in a morphing process whereby the nasal and temporal peripheral regions of the reference lens design are rotated in opposite directions. As will be appreciated, rotating the peripheral regions of the reference lens design in opposite directions results in one zone (that is the distance or the near zone) being enlarged and the other zone being compressed.

It is preferred that the application of a suitable morphing function results in a new lens design having zone balance which is substantially the same as the wearer's preferred zone size balance and a peripheral design which is substantially identical to the peripheral design of the reference lens design.

It is preferred that the area of the reference lens design which lies in the eye path of the wearer is not modified by the morphing process. Nevertheless, the shape of the eye path itself may be modified to satisfy convergence requirements of the wearer for their typical near vision tasks.

In one form of the invention, the reference lens design may be represented using a surface curvature matrix. Advantageously, in this form of the invention the morphing function may be applied to the surface curvature matrix of the reference lens design so as to produce a target surface curvature distribution. In another form of the invention, the reference lens design may be represented using ray traced optical vergences of a lens according to the reference lens design and the morphing function may be applied to the ray traced optical vergences.

In the event that the target surface curvature distribution is not realisable, the surface curvature distribution of the new lens design may be obtained using a process which applies a least squares fit to the target surface. However, it is preferred that morphing process produces a target surface curvature distribution which is close to realisable. In this preferred form, the least squares fit to the target surface curvature distribution may be performed using suitable weighting functions. Ideally, a suitable weighting function will allow critical areas of the new lens design (that is areas around the eye path and in the zones designed for clear vision) to be not affected by the morphing process.

The method of the present invention may be performed on a programmable apparatus. Accordingly, the present invention also provides a programmable apparatus for designing a progressive addition lens design for a wearer, the lens design having one or more design features which are customised according to the wearer's preferences, the apparatus including:

(a) means for obtaining a selected reference lens design, the selected reference lens design having:
  a peripheral design which is suitable for the wearer; and
  design features having known values, the design features including zone size balance, eye path inset and corridor length;
(b) means for retrieving information content from an information repository, the information content including lens geometry data, the lens geometry data being representative of at least the shape of the selected reference lens design;
(c) means for obtaining the wearers preferred value for one or more of the design features, said one or more of the design features including at least the zone size balance; and
(d) means for modifying the information content to thereby obtain modified information content, the modified information content being representative of a new lens design such that each of the one or more design features of the new lens design has substantially the same value as the respective preferred value;

wherein the peripheral design of the new lens design is substantially identical to the peripheral design of the selected reference lens design.

It is preferred that the means for obtaining the wearers preferred value for one or more of the design features includes means for specifying or computing the wearer's preferred value.

The selection of the reference lens design may involve a manual and/or automatic selection process and may be tied to direct or other measures of the wearer, their refractive state, declared visual needs or questionnaire data which reveals their lifestyle and/or ergonomic factors which influence their visual needs.

Preferably, in an embodiment of the present invention which employs a manual reference lens design selection process, the selection process may be performed using an interface means for receiving a reference lens design selection from a user. As will be appreciated, the user may be the wearer or alternatively may be a dispenser (such as an optometrist) who is able to dispense the new lens design to the wearer.

In an embodiment of the invention which employs an automatic reference lens design selection process the selection process may entail computing a reference lens design selection according to user inputs.

The information content may be an electronic data file which is retrieved from the information repository according to the reference lens design selection. It is preferred that the information repository includes a database which indexes a plurality of electronic data files for different reference lens designs. The database may reside on the programmable apparatus or on a data storage device which is remote from, but accessible to, the programmable apparatus.

In an embodiment where the database resides on a data storage device which is remote from the programmable apparatus, the database will preferably be accessible to the programmable apparatus via a communications link (such as the Internet).

The specification of the wearer's preferred values for the one or more design features may also involve a manual or automatic specification process. In an embodiment of the invention which employs a manual specification process, the specification of the wearer's preferred values for the one or more design features may include a user entering the required values of these parameters into the programmable apparatus. In this form of the invention, the means for receiving the wearer's preferred values may include an interface for receiving the parameters from a user.

In an embodiment of the invention which employs an automatic specification process, the selection process may include entering a set of wearer parameters into the programmable apparatus. The programmable apparatus then processes the wearer parameters so as to obtain the wearer's preferred values for the new lens design. It is preferred that the wearer parameters include parameters which are representative of visual behavioural characteristics of the wearer.

The means for modifying the shape of the reference lens design to obtain a target surface having the required design features may include a processing means which is operable to perform a morphing process.

The present invention also provides a computer program for making a programmed apparatus execute a method of designing a progressive lens, the computer program including:

(a) computer program code for processing an electronic file containing a reference progressive lens design having a peripheral design which is suitable for a wearer and design features with known values, said processing modifying the reference progressive lens design so as to provide a new progressive lens design in which at least one of the design features have been customised according to a wearer's preferences; and
(b) computer program code for providing an electronic file containing the new progressive lens design;

wherein the new progressive lens design has substantially the same peripheral design as the reference progressive lens design.

In another embodiment of the present invention there is provided a computer program for making a programmed apparatus design a progressive addition lens design for a wearer, the computer program including:

(a) computer program code for obtaining a reference progressive lens design selection, the selected reference progressive lens design having:
    a peripheral design which is suitable for the wearer; and
    design features having known values, the design features including zone size balance, eye path inset and corridor length;
(b) computer program code for obtaining the wearer's preferred value for one or more of the design features, said one or more of the design features including at least the zone size balance; and
(c) computer program code for modifying the reference progressive lens design to obtain a new progressive lens design in which one or more of the design features have substantially the same value as the respective preferred value;

wherein the peripheral design of the new progressive lens design is substantially identical to the peripheral design of the reference progressive lens design.

The computer program may be encoded into computer readable memory of the programmable apparatus or it may be encoded onto computer readable media (such as a CD, DAT tape or the like) which is readable by the programmable apparatus.

In yet another embodiment of the invention there is provided a system for designing a progressive addition lens design for a wearer, the system including:
(a) a communications link;
(b) at least one client device operatively connected to the communication link;
(c) a server device, including a CPU and memory operatively connected to the CPU, the server device being connected to the communication link, the memory being encoded with a computer program for making the CPU execute:
    receiving parameters from the client device at the server device;
    thereafter selecting a reference lens design having a peripheral design which is suitable for a wearer and design features having known values, the design features including zone size balance, eye path inset and corridor length;
    computing wearer preferred values for one or more of the design features, said one or more of the design features including at least the zone size balance;
    retrieving information content from an information repository, the information content including lens geometry data which is representative of at least the shape of the selected reference lens design;
    modifying the information content to obtain modified information content, the modified information content being representative of a new lens design such that each of the one or more design features of the new lens design has substantially the same value as the respective preferred value; and
    transmitting the modified information content to the client device;

wherein the peripheral design of the new progressive lens design is substantially identical to the peripheral design of the reference progressive lens design.

BRIEF DESCRIPTION OF THE DRAWINGS

The present invention will now be described in relation to various embodiments illustrated in the accompanying drawings. However, it must be appreciated that the following description is not to limit the generality of the above description.

In the drawings.

DETAILED DESCRIPTION OF THE INVENTION

Figure 1:
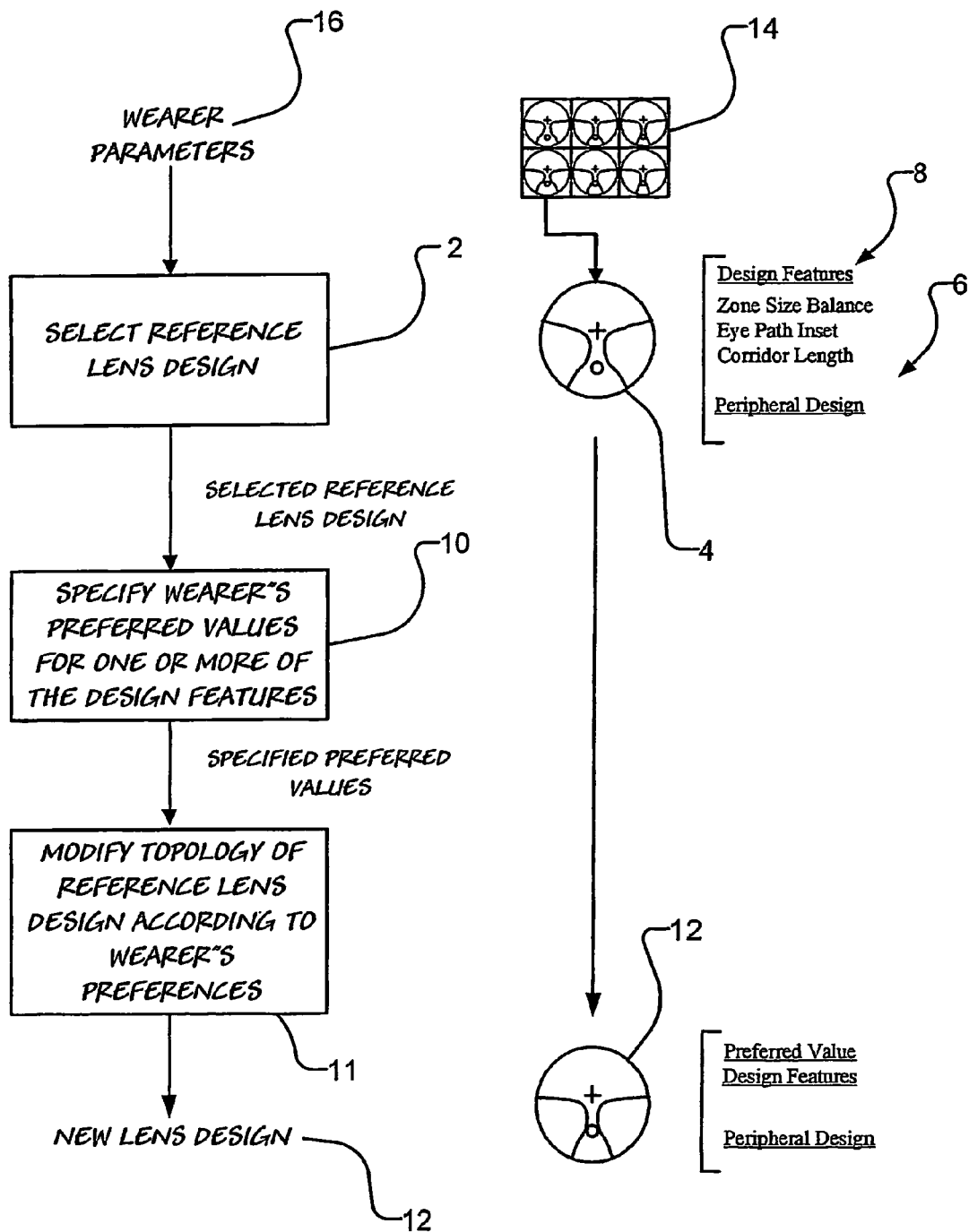
FIG. 1 shows a simplified flow diagram of a method of designing a progressive addition lens according to the preferred embodiment of the present invention.

Referring to FIG. 1 there is illustrated a simplified flow diagram for a method of designing a progressive addition lens for a wearer according to a preferred embodiment of the present invention.

As is shown in FIG. 1, the preferred method involves selecting 2 a reference lens design 4 having a peripheral design 6 which is suitable for a wearer and design features 8 having known values, specifying 10 a wearer's preferred value for one or more of the design features 8 and then modifying 11 the reference lens design 4 to thereby obtain a new lens design 12 wherein the one or more of the design features 8 have substantially the same value as the respective wearer's preferred value and wherein the peripheral design of the new lens design 12 is substantially identical to the peripheral design 6 of the reference lens design 4.

For the purposes of the description of the preferred embodiment, references to the term peripheral design is to be understood to be reference to peripheral blur distribution. However, it is to be understood that the invention is not to be so limited. Indeed, other embodiments are envisaged wherein peripheral design may include other characteristics of the peripheral regions.

In the embodiment illustrated, the design features 8 having known values includes the zone size balance, the eye path inset ('inset'), and the corridor length.

The selection 2 of the reference lens design 4 is accomplished by selecting a particular reference lens design 4 from a range of reference lens designs 14 on the basis of one or more required lens characteristics. Each lens design in the range of reference lens designs 14 will have known lens characteristics.

The one or more required lens characteristics will include the peripheral design and may include the design features 8. Thus, the selection of a reference lens design having one or more required lens characteristics includes selecting a reference lens design having a peripheral design 6 which is suitable for a wearer and may further include selecting the lens on the basis of the design features 8. Of course, the lens characteristics may also include other features such as base curve, near and distance aspherisation and peripheral distribution of surface curvatures.

Ideally, the selection 2 of a particular reference lens design 4 involves a user selecting a reference lens design 4 having a peripheral design which is suitable for the wearer as well as other design features which relate or are matched to a specified set of wearer parameters 16.

The set of wearer parameters 16 are preferably derived from information obtained for a wearer. In this respect, at least some of the wearer parameters 16 may be obtained by direct measurement whilst others may be obtained by interviewing the wearer (for example, to determine a wearer's personal preference, or to determine activities for which the wearer intends to use the lens).

The wearer parameters 16 may include, but not be limited to interpupillary distance, visual behavioural characteristics, lifestyle information (for example, the activities for which the wearer intends to use the lens), prescription data (that is, sphere, addition and cylinder), age, gender and frame geometry information.

Figure 2:
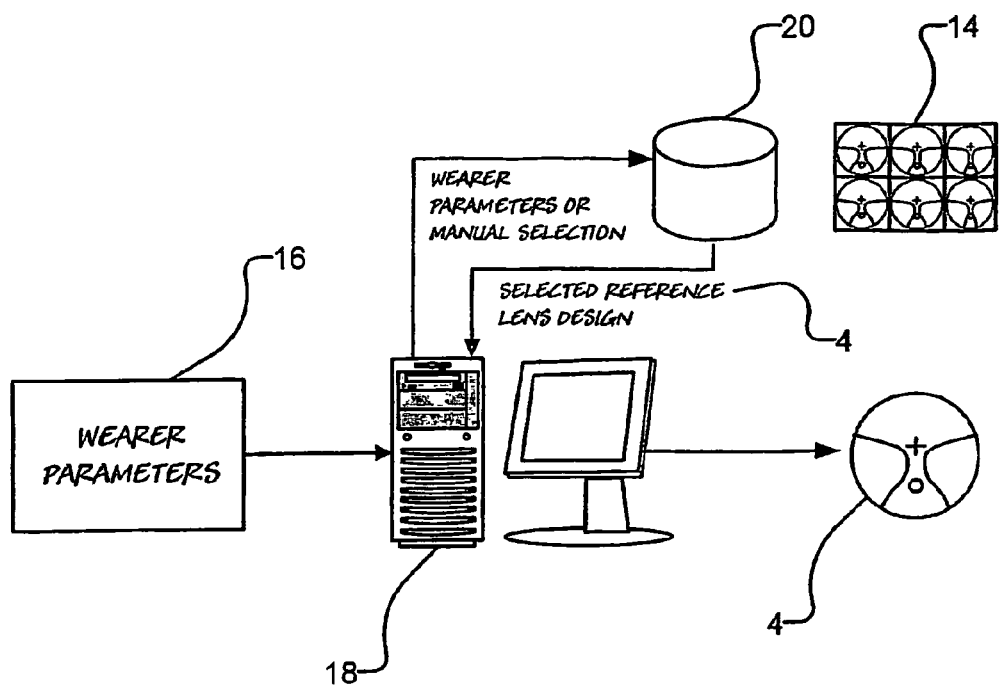
FIG. 2 shows a simplified block diagram of a process for selecting a reference lens design suitable for use with the preferred embodiment of FIG. 1.

In the illustrated embodiment, and as is shown in FIG. 2, the selection of the reference lens design 4 is performed by a user (for example, a dispenser) interacting with a programmed device 18 (such as a desktop computer equipped with suitable software) which is operable to automatically select a reference lens design 4 according to wearer parameters 16 which have been entered into, or computed by, the programmed device 18. However, it will be appreciated that the selection of a reference lens design 4 may entail a manual selection process. Indeed, in a form of the invention which employs a manual selection process the programmed device 18 may provide a graphical interface which is operable to enable a user to select a reference lens design 4. In this way, a manual selection process may be accomplished by manually selecting a particular reference lens design 4 from a range of reference lens designs 14 according to the required set of lens characteristics. The range of lens designs 14 may be displayed in the form of a list, or a table which displays the available range of lens designs 14 together with their respective characteristics.

In the present case, the selection process involves an automated process whereby the programmed device 18 automatically selects the reference lens design 4 according to wearer parameters 16 which have been entered into the programmed device 18 by a user. Ideally, the automatic selection process indexes the wearer parameters 16 into an information repository, such as a database 20, which has access to the range of lens designs 14 so as to enable the selection of a reference lens design 4 having design features which are most closely related to the wearer parameters 16.

As described above, the selected reference lens design 4 is a standard lens design from a range of lens designs 14 having design features, and possibly other characteristics, which relate to the wearer parameters 16. However, although the selected reference lens design 4 may have design features which relate to the wearer parameters 16, the selection of a 'standard' design may result in some of the lens characteristics having properties which are not closely related to at least some of the wearer parameters 16. Having said that, other characteristics (such as those which contribute to the peripheral design of a lens) may be entirely acceptable to the wearer.

Referring back to FIG. 1, having selected 2 a reference lens design 4, the method then relies on the specification 10 of wearer preferred values for one or more of the design features 8 (in the present case, the zone size balance, the eye path inset and the corridor length).

In a first preferred embodiment of the invention, only the wearer's preferred value for the zone size balance will be specified. Thus, in this embodiment, the method ultimately provides a new lens design 12 having a zone size balance which is more closely related to the wearer parameters 16, and thus the needs of the wearer, than the reference lens design 4.

The wearer's preferred zone size balance value may be determined using the wearer parameters 16 which are related to 'lifestyle' information. Such information may then be used to compute the relative frequency for which the wearer utilises the distance zone as compared to the near zone.

Indeed, the wearers preferred value for the zone size balance may be determined by computing, using a programmed device 18 (ref. FIG. 2), a relative proportion for which each of the two zones (that is, the distance zone and the near zone) are used by the wearer. The relative proportion may be determined by analysing the 'lifestyle' information of the wearer and generating a score which is indicative of the extent to which the wearer relies on the near zone as compared to the distance zone.

In an alternative embodiment, a wearer's preferred values may also be specified for the inset and/or corridor length, as derived from the ergonomics of a reading task. Thus, in this preferred form, the new lens design 12 may have an inset and/or corridor length which is more closely related to the needs of the wearer than that of the reference lens design 4.

Having specified 10 the wearer preferred values for one or more of the design features 8 (in this case the wearer's preferred value for zone size balance), the selected reference lens design 4 is then modified 10 so as to obtain a new lens design 12. In the present case, the reference lens design 4 is modified by modifying 11 the shape of the reference lens design 4 according to the wearer's preferences. As described previously, the new lens design 12 will have one or more design features 8 which have substantially the same value as the respective wearer's preferred value and a peripheral design 6 which is substantially identical to the peripheral design 6 of the reference lens design 4.

According to the preferred embodiment of the present invention, the modification 11 of the shape of the reference lens design 4 to obtain a new lens design 12 involves a morphing process.

The morphing process may be accomplished by applying a suitable morphing function(s) to the reference lens design 4 to thereby modify the surface curvature distribution of the reference lens design 4 according to the wearer's preferred values. In this respect, the morphing process may produce a target surface curvature distribution which may, or may not, be realisable.

In the event that the target surface is not realisable, the morphing process may employ a least squares fit to the target surface to thereby obtain the surface curvature distribution of the new design. The process of a least squares fit may include the use of non-uniform weighting functions. Weighting functions will be described in more detail later.

In the preferred embodiment, different morphing functions may be used for each of the one or more design features 8 for which a wearer's preferred value has been specified. Hence, a suitable morphing process may utilise a zone size balance morphing function and, optionally, an inset morphing function and/or a corridor length morphing function.

Figure 3:
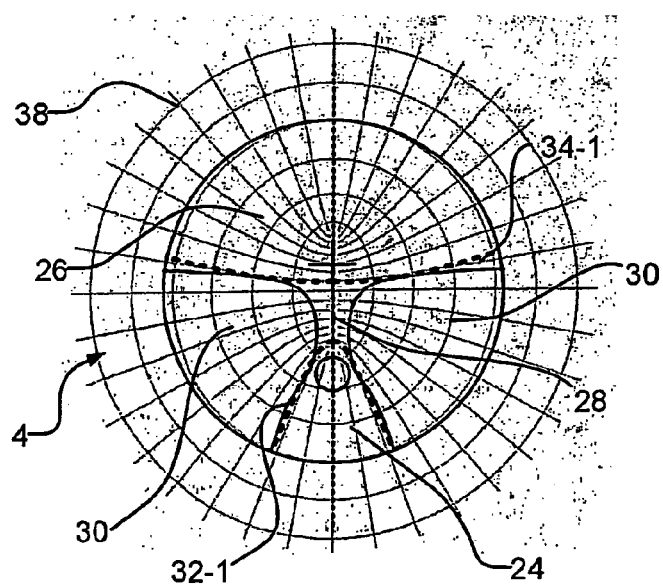
FIG. 3 shows a view of a simplified contour map for the surface of an example of a progressive lens element overlayed on top of the grid of the elliptical coordinate system.

Before turning to a description of examples of morphing processes which utilises the above referenced morphing functions, for the purposes of avoiding confusion, various lens features which are referred to throughout this description will now be elaborated with reference to FIG. 3.

Referring to FIG. 3, there is shown a contour map for an 'example' reference lens design 4. As is shown, the example reference lens design 4 includes a distance zone 26, a near zone 24 and a corridor 28 therebetween which provides a gradual power progression from the distance zone 26 to the near zone 24 without any dividing line or prismatic jump.

The reference lens design of FIG. 3 also includes peripheral regions 30 which are located adjacent to the near zone 24, the distance zone 26 and the corridor 28.

The near zone 24 and the distance zone 26 are each bounded by respective 'boundaries', the approximate location of which has been shown using respective hyperbolas 32-1, 34-1. For the purpose of this description, the boundary 32-1 which bounds the near zone 24 will hereafter be referred to as the 'near zone boundary'. Similarly, the boundary 34-1 which bounds the distance zone 26 will hereafter be referred to as the 'distance zone boundary'.

Having provided clarification of the lens features which will be referred to in the remainder of the description, the description will now turn to examples of morphing processes which are suitable for morphing the design features of the reference lens 4.

EXAMPLE 1

Zone Size Balance Morphing

Figure 4:
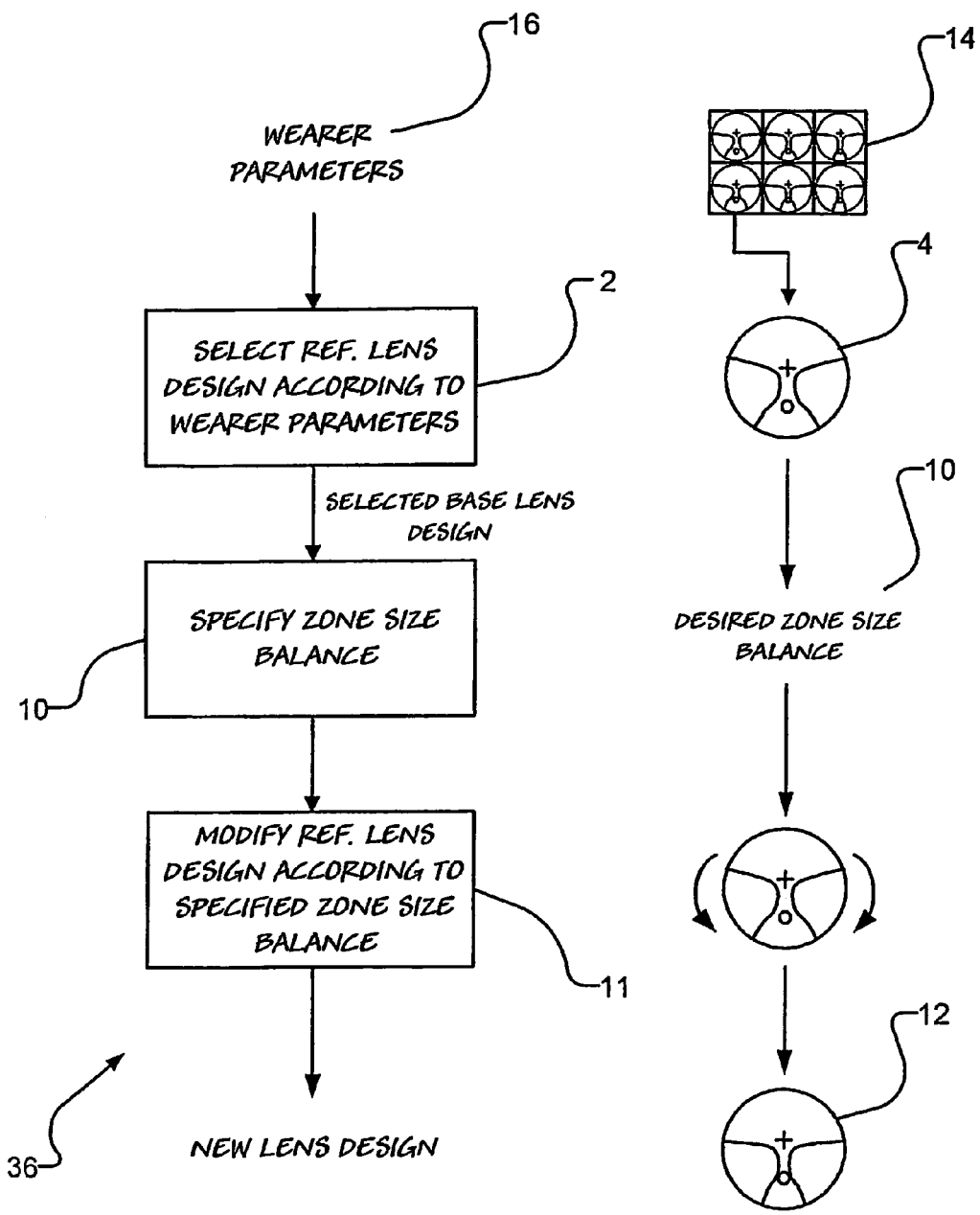
FIG. 4 shows a simplified flow diagram of a method of designing a progressive lens having a customised zone size balance.

Turning now to FIG. 4 there is shown a zone balance morphing process 36 for providing a new lens design 12 having a zone size balance which is substantially the same as a wearer's preferred zone size balance. Here, the zone size balance morphing process 36 is accomplished by rotating peripheral regions 30 (refer FIG. 3) on the nasal and temporal sides of the reference lens design 4 in opposite directions.

The rotation of the peripheral regions 30 (refer FIG. 3) results in one zone (that is the distance zone or the near zone) being enlarged and the other zone being compressed. However, as a result of the zone size balance morphing process 36, the shape of the region of the new lens design 12 which lies in the eye path of the wearer remains substantially the same as the shape of the region of the eye path of the reference lens design 4.

To accomplish a zone size balance morphing process 36, a suitable zone size balance morphing function may be used. Moreover, the zone size morphing process 36 may also require the selection of a suitable coordinate system.

In terms of a suitable zone size morphing function, such a function is a function which results in the new lens design 12 having a zone size balance with a value which is substantially the same as the wearers preferred zone size balance value as well as a peripheral design 6 which is substantially identical to the peripheral design 6 of the reference lens design 4.

An example of a coordinate system 38 suitable for designing a morphing function for use with the reference lens design 4 is shown in FIG. 3. As is shown, the coordinate system 38 is an elliptical coordinate system including sets of confocal ellipses and hyperbolas.

Here, if the foci are located at (o,a) and (0, −a) then coordinate transformations are able to be defined viz:

$$x = r\sin\theta$$
$$y = \sqrt{a^2 + r^2} \cos\theta$$

and $$r = \sqrt{\left(\sqrt{u^2 + 4a^2x^2} - u\right)/2}$$
$$\theta = \tan^{-1}\left(\frac{x\sqrt{a^2 + r^2}}{yr}\right)$$

where:

$$u = a^2 - x^2 - y^2$$

Figure 5:
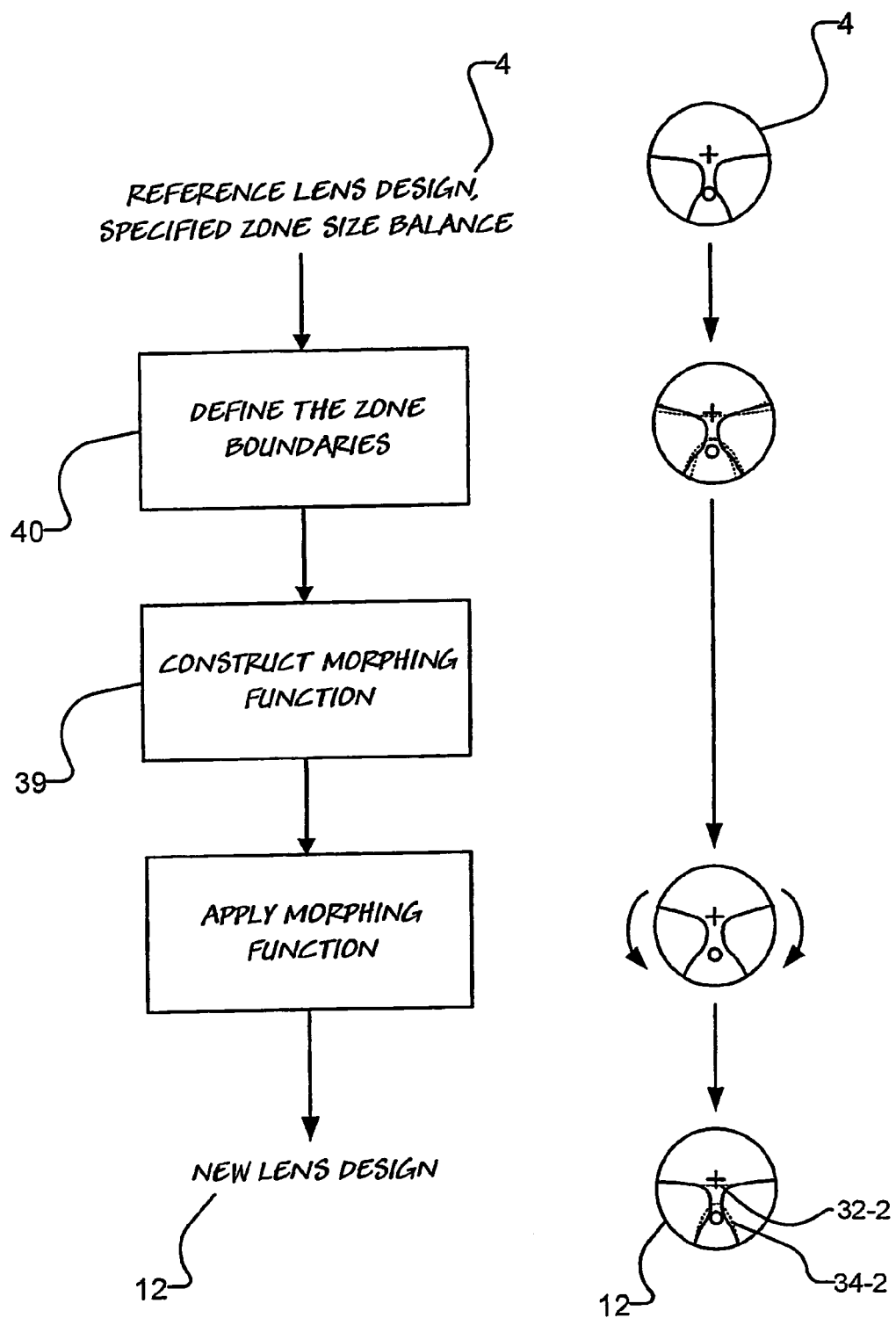
FIG. 5 shows a simplified flow diagram of a zone size balance morphing process which is suitable for the method shown in FIG. 4.

Turning now to FIG. 5, by employing a suitable coordinate system such as the elliptical coordinate system described above, a suitable zone size balance morphing function may be constructed 39 by way of a morphing function design procedure. As is shown in FIG. 5, a zone size balance morphing function design procedure may entail defining 40 the zone boundaries 32-1, 34-1 (refer FIG. 3) for both the near zone 24 (refer FIG. 3) and the distance zone 26 (refer FIG. 3) of the selected reference lens design 4.

The distance zone boundary 34-1 and the near zone boundary 32-1 may be defined 40 using any suitable 'smooth curve' which approximates the respective boundary 32-1, 34-1.

Having defined the zone boundaries for the reference lens design the zone boundaries for the new lens design are then defined. Turning now to the example shown in FIG. 6, here the distance zone boundary 34-1 and the near zone boundary 32-1 of the reference lens design 4 have been defined using hyperbolas having parameters which have been selected so as to approximate a respective boundary. As is shown, a first set of hyperbolas has been constructed so as to provide a reasonable fit to the 0.75 diopter contours 42 in the central region of the lens.

Effectively, the ratio of the areas enclosed by each hyperbola represents the known zone size balance of the reference lens design 4.

A second set of hyperbolas respectively show the approximate locations of the near zone boundary 34-2 and the distance zone boundary 32-2 required to achieve a zone size balance having a value which is substantially the same as a wearer's preferred value. In other words, the second set of hyperbolas shows the zone boundaries for the target surface, and thus approximates locations of the near zone boundary 34-2 and the distance zone boundary 32-2 of the new lens design 12.

Figure 6:
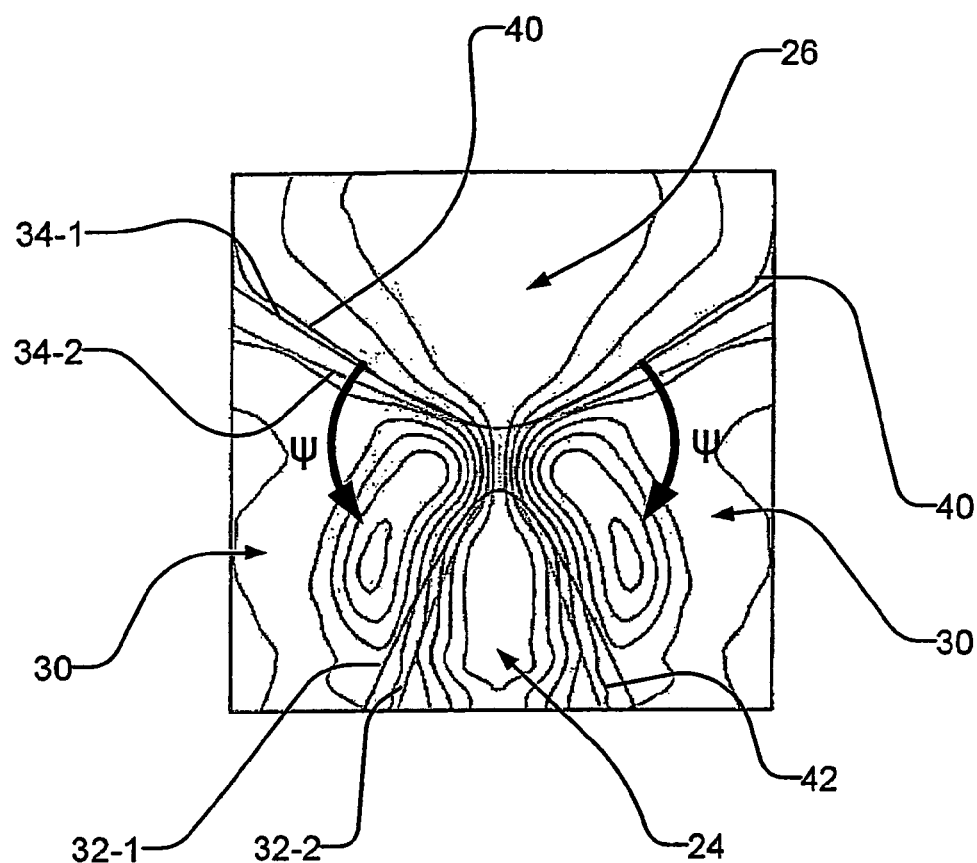
FIG. 6 shows a contour map of an example reference lens design showing the zone boundaries of a reference lens design and the zone boundaries of the new lens design.

In the example shown in FIG. 6, the wearer's preferred zone size balance requires a 15 degree decrease in the near zone 24 and a corresponding increase on the distance zone 26.

The 15 degree rotation is preferably achieved by rotating the peripheral regions 30 (for example, a nasal and a temporal region) of the reference lens design 4 by 7.5 degrees in direction ψ. In this way, the sum of the zone sizes (that is the angular sizes) may be kept constant, and thus the new lens design 12 has a power distribution which is close to realisable. As a result, the resulting surface is likely to be relatively insensitive to weighting functions.

Figure 7:
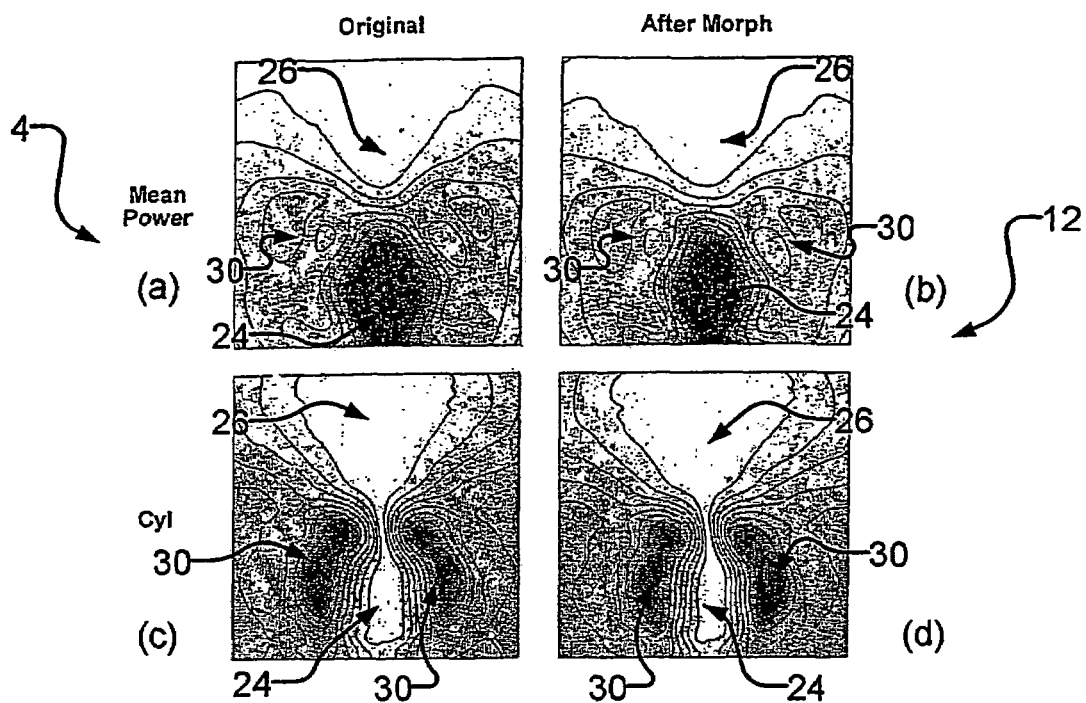
FIG. 7 shows the surface mean power and astigmatism contours of the reference lens design compared to a target surface obtained by a zone size balance morphing process.
Figure 8:
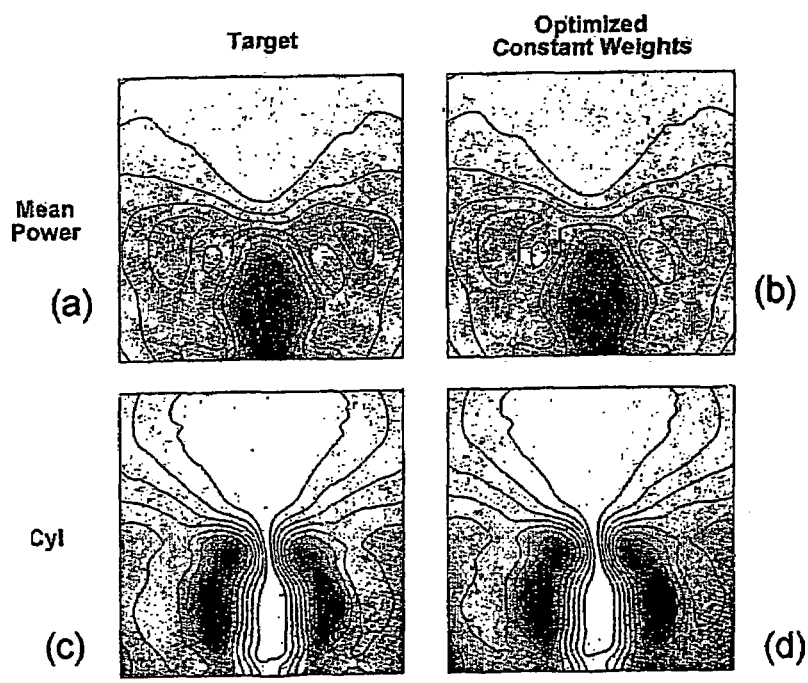
FIG. 8 shows a comparison of the mean power and cylinder for a target surface with a real surface obtained by way of a best fit using uniform weights.

The effects of the zone size balance morphing process may be better understood by referring to FIG. 7 and FIG. 8.

In this respect, FIG. 7 illustrates the surface mean power and astigmatism contours before and after morphing a reference lens design 4 so as to obtain a new lens design having a zone size balance according to a wearer's preferences. As is shown in FIG. 7(b) and FIG. 7(d), as a result of modifying the reference lens design 4 so as to modify the zone size balance according to the wearer's preferred value, the angular size of the near zone 24 of the new lens design 12 has been reduced as compared to FIG. 7(a) and FIG. 7(c). Similarly, the angular size of the distance zone 26 has been enlarged relative to that of the reference lens design 4. However, as is evident from inspection of the contours in the peripheral regions 30, despite the modification of the zone size balance, the peripheral design of the new lens design 12 has remained substantially the same as the peripheral design of the reference lens design 4.

Turning now to FIG. 8 there is illustrated plots of the mean power and cylinder for a target surface and the best fit to the target surface ('the real surface') of the actual new lens design 12 calculated using uniform weights on a 80 mm diameter square grid. As is evident from a comparison of FIG. 8(a) with FIG. 8(b), and FIG. 8(c) with FIG. 8(d), at the 0.25 diopter contour level the optimised surface is substantially identical with the target surface. Indeed, the only noticeable difference appears to be a slight increase on the maximum peripheral cylinder.

Figure 9:
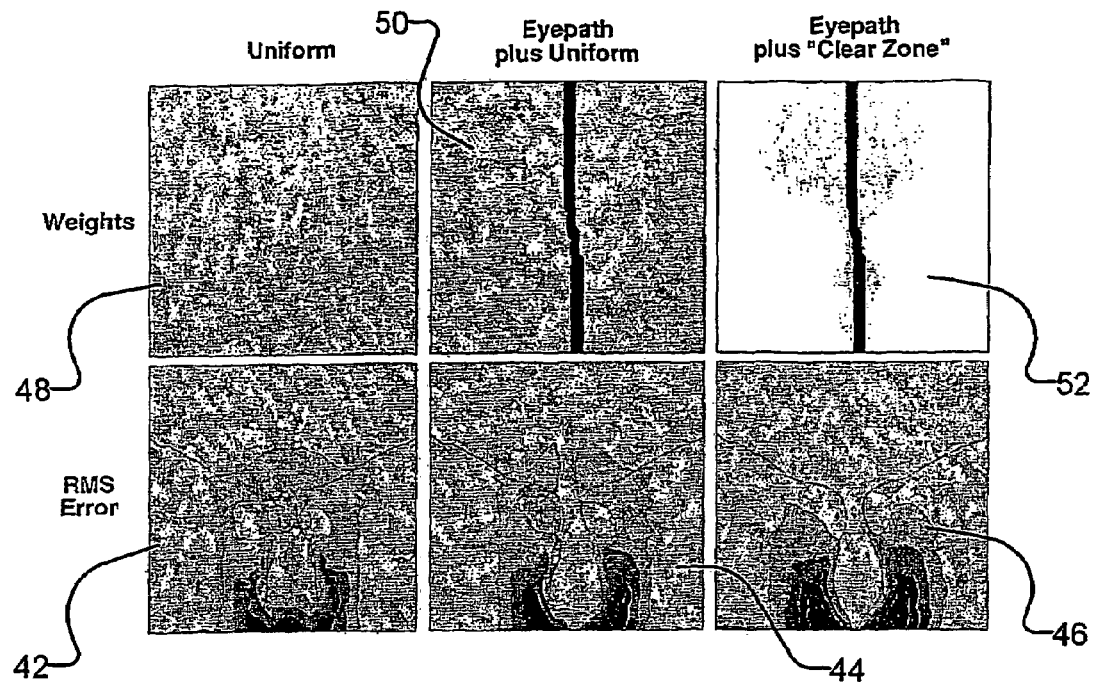
FIG. 9 shows the RMS difference between a target surface and a real surface obtained using different weighting functions.

Referring now to FIG. 9, there is shown a number of plots 42, 44, 46 of the RMS differences between the target surface and the optimised surface of the new lens design using three different weighting functions 48, 50, 52. Here the contours are illustrated at 0.03 diopters. Plots 48, 50, 52 show contours of various weights, while plots 42, 44, 46 display the RMS power errors obtained after the least squares fit with the corresponding weight distribution 48, 50, 52.

More specifically, plot 44 shows the result of including a high amplitude line of weighting along the eye path. Here, the errors are diminished along the eye path as expected, but the improvement does not extend any further into the distance zone.

Plot 46 shows the result of tailoring the background weights to be highest in the region of low cylinder. As a result of the tailoring, the optimised surface matches the target surface to better than 0.03 diopters over the entire clear vision region of the lens.

The result of 'pushing' the error outside of the 'important' region of the lens is that the power in the periphery may be further altered compared to the target surface. As described earlier, the method of the invention seeks to produce a new lens design having a zone size balance with a value which is substantially the same as a wearer preferred zone balance value, but which has a peripheral design which is substantially the same as the selected reference lens design.

Figure 10:
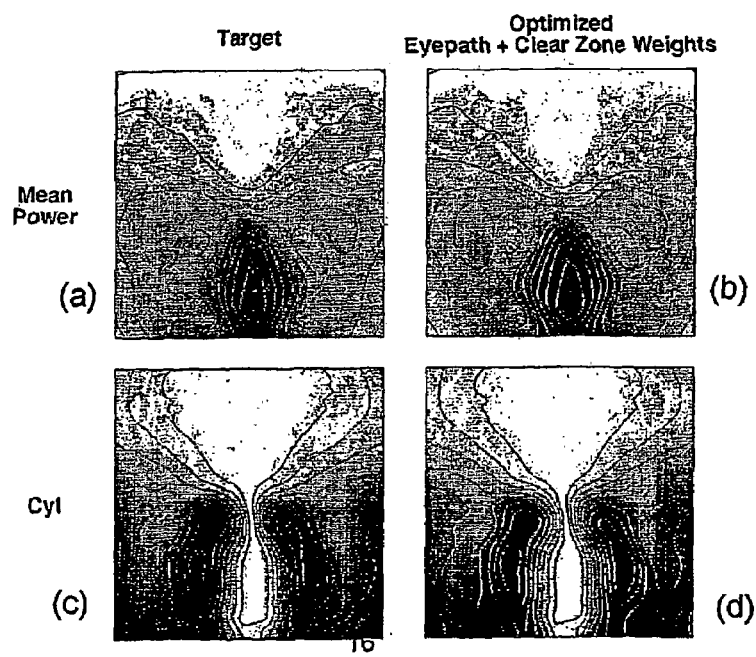
FIG. 10 shows a comparison of the mean power and cylinder of a target surface compared with a real surface obtained using a particular weighting function.

Turning now to FIG. 10, there is shown the effect of the final weighting function 52 (ref FIG. 9) on the mean power (ref. FIG. 10(b)) and cylinder plots (ref. FIG. 10(d)) of the optimised surface as compared to the target surface.

As is evident from inspection of a comparison of FIG. 10-d against FIG. 10(c), the peripheral cylinder has 'come up' a bit more, as compared to the target surface and the uniform weighted optimisation. Nonetheless, aside from the changes in the distance zone and the near zone angular sizes, the overall distributions of the mean power and cylinder are substantially identical to the target surface.

Figure 11:
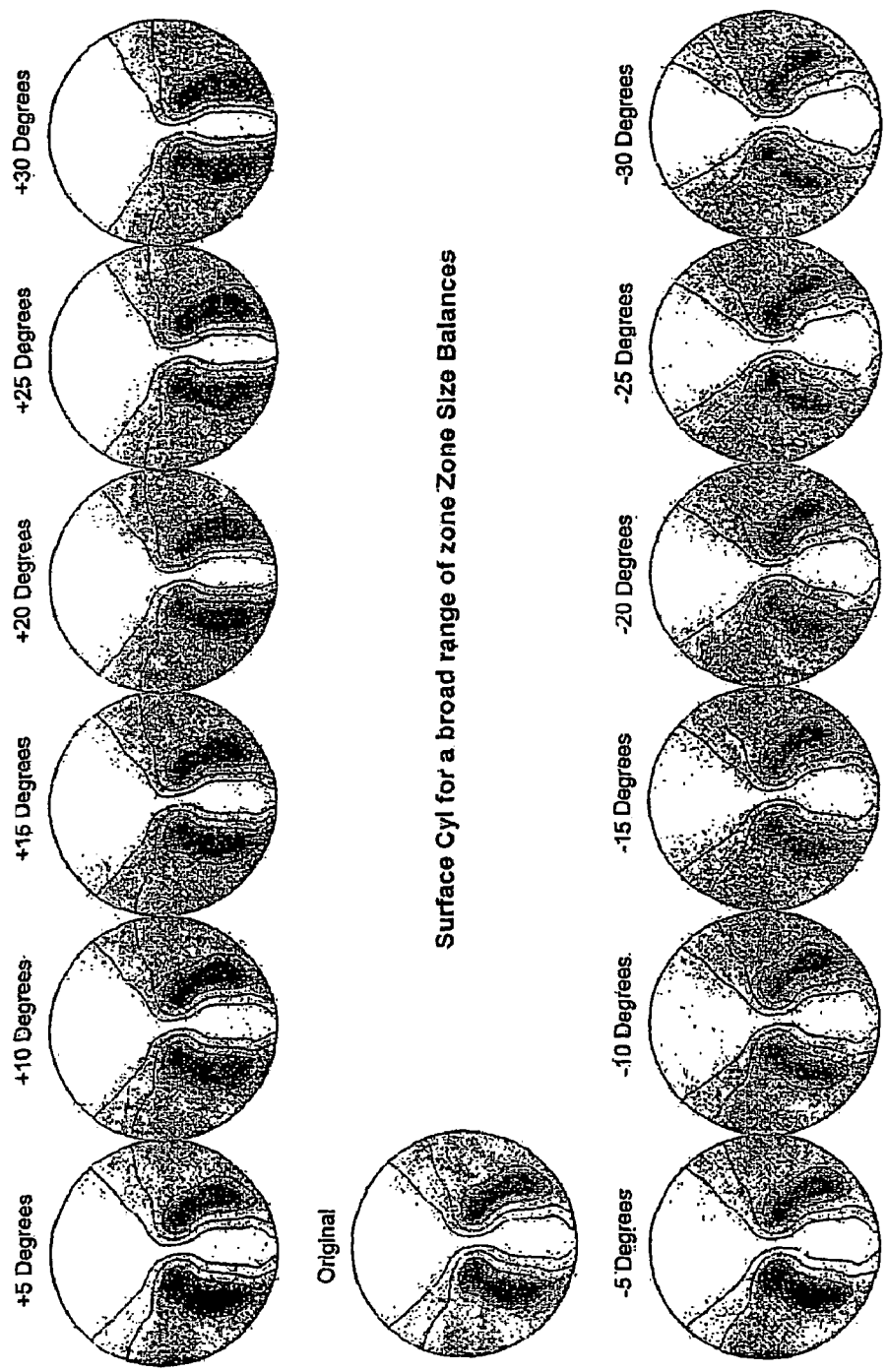
FIG. 11 shows the surface astigmatism distribution for a set of computed surfaces over a range of zone size balances.

Referring now to FIG. 11 there is shown the surface astigmatism distribution for a set of computed surfaces over a range of zone size balances. All of the surfaces started from the same reference lens design, were then 'morphed' using a morphing function to provide a respective target surface, and then least squares fitted, using an appropriate weighting function, so as to provide the realisable surface of the new lens design.

EXAMPLE 2

Eye Path Inset Morphing

Progressive addition lenses may also include an inset.

Where a selected reference lens design 4 has an inset, then the method of the invention is able to modify the shape of the reference lens 4 design to thereby obtain a new lens 12 design having a zone size balance which corresponds to the wearer's preferred value as well as an inset which is substantially the same as the inset of the reference lens design 4.

Alternatively, the method may simply provide a new lens design 12 having both a zone size balance and an inset which are substantially identical to the respective wearer's preferred values. That is, the new lens design 12 may have a different inset to the reference lens design 4.

Figure 12:
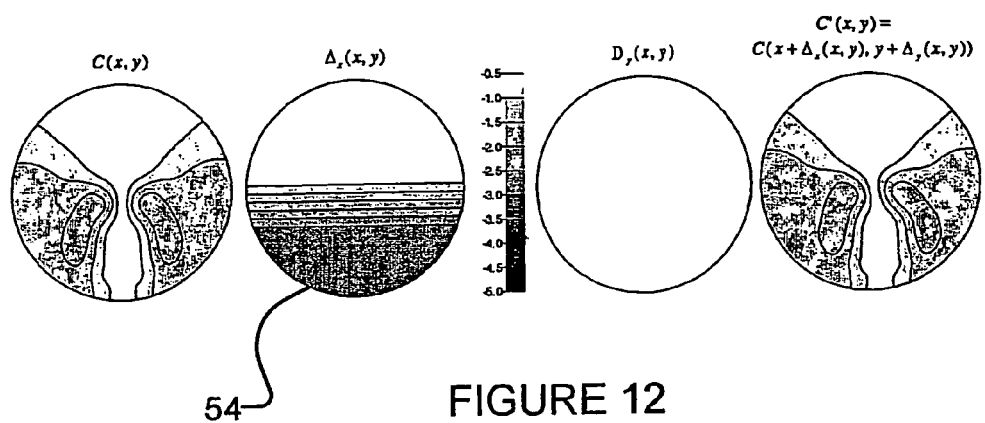
FIG. 12 shows the result of an eye path inset morphing process.

In this respect, in FIG. 12 there is shown the result of eye path inset morphing process, which may be used together with the zone size balance morphing process 36, to provide a new lens design 12 having both an inset and a zone size balance which are more closely related to the needs of the wearer.

As is shown in FIG. 12, the inset morphing process applies a morphing function which modifies the inset according to the wearer's preferred inset value. In the example shown in FIG. 12, an 'accordion' type shift 54 has been used to obtain the desired eye path inset. However, other types of shifting may also be suitable.

An inset morphing process may also use suitable weighting functions which emphasise the part of the surface curvature that should remain unchanged. A suitable weighting function may be constructed as a simple function of surface cylinder. Alternatively, a suitable weighting function may be constructed based on a single specified contour level.

EXAMPLE 3

Corridor Length Morphing Process

Figure 13:
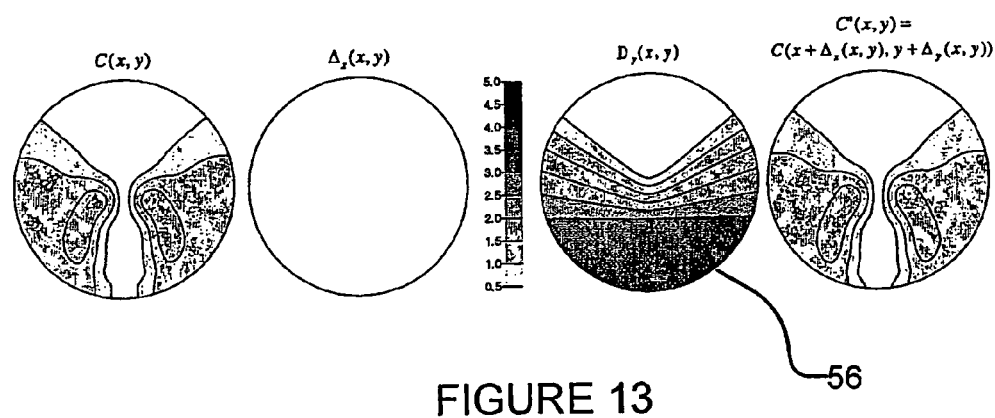
FIG. 13 shows the result of a corridor length morphing process.

In FIG. 13 there is shown the result of a corridor length morphing process, which may be used together with the zone size balance morphing process 36, to provide a new lens design having both a zone size balance and a corridor length which is more closely related to the needs of the wearer.

As is shown in FIG. 13, the corridor length morphing process applies a morphing function which modifies (that is lengthens or shortens) the corridor length according to the wearer's preferred corridor length value.

Advantageously, the corridor length morphing process provides a new lens design having substantially the same shape eye path, substantially the same specified angular sizes of the distance zone and near zone, and substantially the same peripheral design as the reference lens.

As is shown in FIG. 13, a morphing function which is suitable for use in a corridor length morphing process may employ a 'flared accordion' expansion 56, or contraction, to obtain the desired corridor length. Other types of expansion, or contraction may also be suitable.

A corridor length morphing process may also use suitable weighting functions which emphasise the part of the surface curvature that should remain unchanged. A suitable weighting function may be constructed as a simple function of surface cylinder. Alternatively, a suitable weighting function may be constructed based on a single specified contour level.

EXAMPLE 4

Combined Zone Size Balance, Corridor Length and Eye Path Inset Morphing

Figure 14:
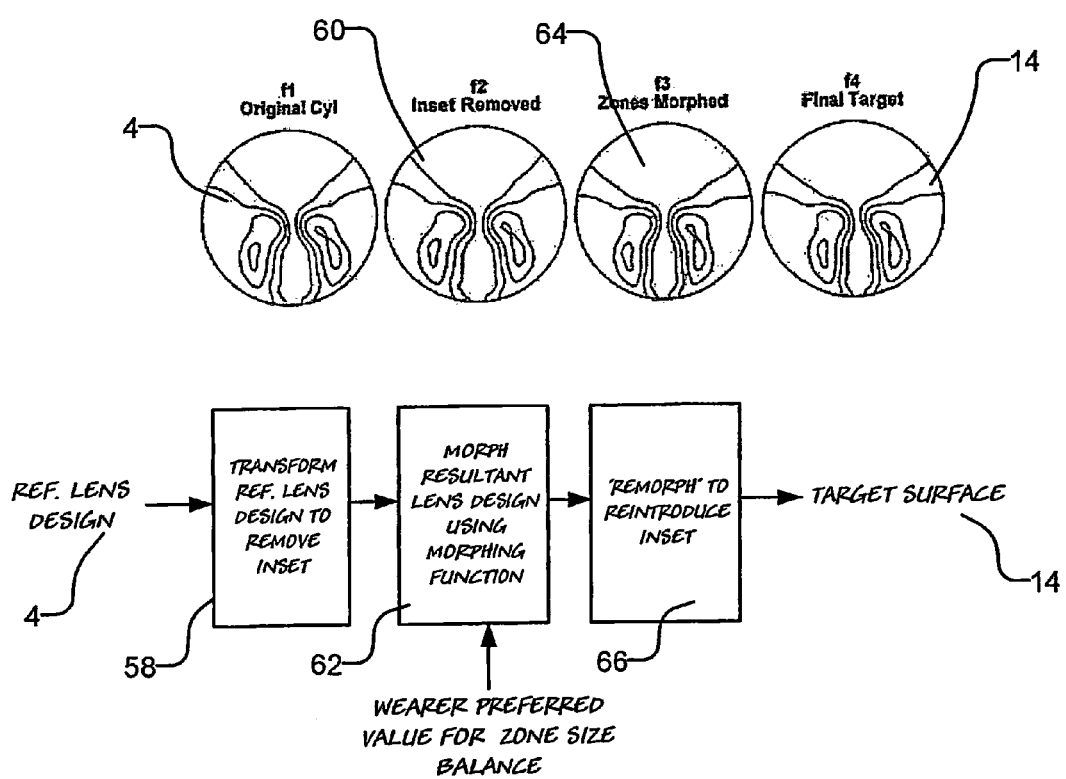
FIG. 14 shows an example of a multistage morphing process.

As is shown in FIG. 14, a morphing process may involve a multiple stage process.

A multistage morphing process may involve transforming 58 the shape of the reference lens design 4 by applying a first morphing function (an inset morphing function) to the reference lens 4 design to thereby provide an intermediate design 60 having the inset removed.

Having removed the inset, the method may then perform a second transformation process 62 whereby a second morphing function (a zone size balance morphing function) is applied to lens design 60 so as to provide a lens design having a zone size balance 64 according to the wearer's preferred zone size balance value.

Finally, a third morphing function (an inset morphing function) is applied 66 to reintroduce the original inset of the reference lens design 4 and thereby obtain the resultant target surface.

Indeed, although the preceding example has been described in terms of multistage process which modifies a reference lens design 4 having an inset so as to obtain a new lens design 14 having a zone size balance which matches the wearer's preferred value as well as an inset which is the substantially the same as the reference lens design, it is to be understood that other types of multistage morphing process are also possible.

For example, a multistage morphing process which is suitable for the method of the present invention may involve the application of a zone size balance morphing function and a corridor length morphing function to there by provide a new lens design having both a zone size balance and a corridor length matches the wearer's respective preferred values.

Alternatively, a multistage morphing process may entail the application of a zone size balance morphing function, an inset morphing function and a corridor length morphing function to there by provide a new lens design having a zone size balance, an inset and a corridor length having values matching the wearer's respective preferred values.

Figure 15:
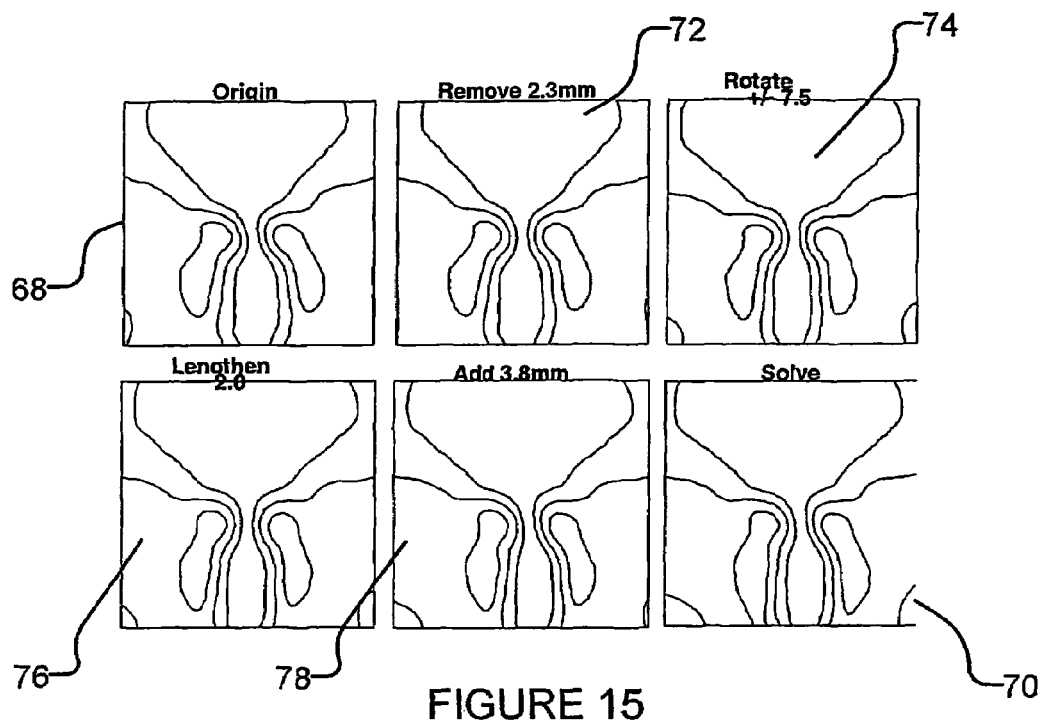
FIG. 15 shows shows the surface astigmatism contours at various stages of a multistage morphing process.

Indeed, turning to FIG. 15 there is shown an example of the effect of a multistage morphing process which modifies the surface of a reference lens design 68 having a 2.3 mm inset, so as to provide a new lens design 70 having a modified inset, zone size balance and corridor length.

More specifically, the illustrated multistage morphing process first removes the 2.3 mm inset using an inset morphing function to provide surface 72. The multistage morphing process then applies a zone size balance morphing function so as to provide surface 74.

Using a corridor length morphing process, the corridor length of the surface 74 is then morphed (here the corridor length is increased by 2.0 mm) so as to provide surface 76. Surface 76 is then morphed using an inset morphing function so as to introduce an inset of 3.8 mm, and thus provide surface 78.

Having applied the morphing functions for morphing the power matrix to obtain surface 76, the next step of the multistage morphing process involves computing the least squares fit to surface 76 so as to obtain a lens surface 70 which is realisable.

In this respect, a better final outcome will be achieved if an appropriate 'weighting' function is used for a least squares fit. An appropriate weighting function will be a function that emphasises the region of the target surface that should be kept unchanged. Here, surface 70 shows the actual realised surface after a least squares fit has been applied to surface 76.

Figure 16:
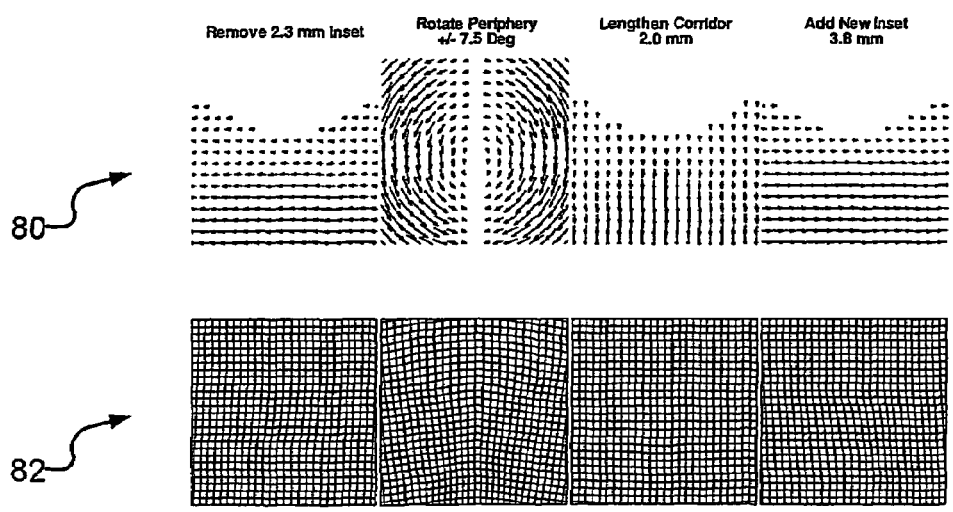
FIG. 16 shows a vector diagram of the direction and magnitude of the movement required to achieve the morphing of the multistage morphing process and grid distortion plots illustrating the spatial distortions imposed by the morphing functions.

Turning to FIG. 16, there is shown a series of vector diagrams 80 showing the direction and magnitude of the movement required to achieve the morphing of the multistage morphing process of FIG. 15. Also shown are grid distortion plots 82 illustrating the spatial distortions imposed by the respective morphing functions.

It is envisaged that the method of the invention will be useful for dispensing a customised lens design based on existing designs.

Finally, it will be understood that there may be other variations and modifications to the configurations described herein that are also within the scope of the present invention.

The invention claimed is:

1. A method of designing a progressive lens, the method including modifying a reference progressive lens design having a peripheral design which is suitable for a wearer and having design features with known values, said modifying providing a new progressive lens design in which at least one of the design features have been customised according to the wearer's preferences, wherein the new progressive lens design has substantially the same peripheral design as the reference progressive lens design.

2. A method according to claim 1 wherein said modifying includes modifying the shape of the reference progressive lens design.

3. A method according to claim 1 wherein the design features having known values includes zone size balance, eye path inset and/or corridor length.

4. A method according to claim 1 wherein modifying the reference progressive lens design to provide a new progressive lens design having design features which have been customised according to the wearer's preferences includes modifying the reference progressive lens design's zone size balance according to the wearer's preferred value for zone size balance.

5. A method according to claim 3 wherein the modifying of the zone size balance includes modifying the reference progressive lens design's ratio of distance zone angular size to near zone angular size whilst maintaining the sum of the angular sizes constant so that peripheral regions of the new progressive lens design retain substantially the same peripheral blur distribution as peripheral regions of the reference progressive lens design.

6. A method according to claim 1 wherein the reference progressive lens design is modified by morphing the reference progressive lens design's progressive surface power distribution.

7. A method according to claim 6 wherein said morphing includes a plurality of morphing processes, each morphing process using a morphing function for a respective design feature.

8. A method according to claim 5 wherein said morphing includes rotating the nasal and temporal peripheral regions of the reference lens design in opposite directions.

9. A method according to claim 5 wherein each morphing process uses an elliptical coordinate system.

10. A method according to claim 1 wherein the zone size balance is modified according to a wearer's preferred value.

11. A method according to claim 5 wherein the reference progressive lens design is represented in the form of a surface curvature matrix and wherein the morphing of the reference progressive lens design's progressive surface power distribution includes applying a morphing function to the surface curvature matrix so as to produce a target surface curvature distribution for the new progressive lens design.

12. A progressive lens element having a design which has been produced using a method according to claim 1.

13. A method of designing a progressive addition lens design for a wearer, the method including the steps of:
a) selecting a reference progressive lens design, the reference progressive lens design having:
a peripheral design which is suitable for the wearer; and
design features having known values, the design features including zone size balance, eye path inset and corridor length;
b) specifying the wearer's preferred value for one or more of the design features, said one or more of the design features including at least the zone size balance; and
C) modifying the reference progressive lens design to obtain a new progressive lens design, the design features of the new progressive lens design which correspond to the design features having specified wearer preferred values have substantially the same value as the respective preferred value; wherein the peripheral design of the new progressive lens design is substantially identical to the peripheral design of the reference progressive lens design.

14. A method according to claim 13 wherein said modifying of the reference progressive lens design includes modifying the shape of the reference progressive lens design.

15. A method according to claim 13 wherein the reference progressive lens design is modified by morphing the reference progressive lens design's progressive surface power distribution.

16. A method according to claim 15 wherein said morphing includes a plurality of morphing processes, each morphing process using a morphing function for a respective design feature.

17. A method according to claim 15 wherein said morphing includes rotating the nasal and temporal peripheral regions of the reference lens design in opposite directions.

18. A method according to claim 15 wherein each morphing process uses an elliptical coordinate system.

19. A method according to claim 13 wherein the zone size balance is modified according to a wearer's preferred value.

20. A method according to claim 15 wherein the reference progressive lens design is represented in the form of a surface curvature matrix and wherein the morphing of the reference progressive lens design's progressive surface power distribution includes applying a morphing function to the surface curvature matrix so as to produce a target surface curvature distribution for the new progressive lens design.

21. A progressive lens element having a design which has been produced using a method according to claim 13.

22. A programmable apparatus for designing a progressive addition lens design for a wearer, the lens design having one or more design features which are customised according to the wearer's preferences, the apparatus including:
(a) means for obtaining a selection of a reference lens design, the selected reference lens design having:
a peripheral design which is suitable for the wearer; and
design features having known values, the design features including zone size balance, eye path inset and corridor length;
(b) means for retrieving information content from an information repository, the information content including lens geometry data, the lens geometry data being representative of at least the shape of the selected reference lens design;
(c) means for obtaining the wearer's preferred value for one or more of the design features, said one or more of the design features including at least the zone size balance; and
(d) means for modifying the information content to thereby obtain modified information content, the modified information content being representative of a new lens design such that each of the one or more design features of the new lens design has substantially the same value as the respective preferred value; wherein the peripheral design of the new lens design is substantially identical to the peripheral design of the selected reference lens design.

23. A system for designing a progressive addition lens design for a wearer, the system including:
(a) a communications link;
(b) at least one client device operatively connected to the communication link;
(c) a server device, including a CPU and memory operatively connected to the CPU, the server device being connected to the communication link, the memory being encoded with a computer program for making the CPU execute:
receiving parameters from the client device at the server device;
thereafter selecting a reference lens design having a peripheral design which is suitable for the wearer and design features having known values' the design features including zone size balance, eye path inset and corridor length;
computing wearer preferred values for one or more of the design features, said one or more of the design features including at least the zone size balance;
retrieving information content from an information repository, the information content including lens geometry data which is representative of at least the shape of the selected reference lens design;
modifying the information content to obtain modified information content, the modified information content being representative of a new lens design such that each of the one or more design features of the new lens design has substantially the same value as the respective preferred value; and transmitting the modified information content to the client device; wherein the peripheral design of the new lens design is substantially identical to the peripheral design of the reference lens design.

24. A computer program embodied in a tangible computer readable medium for making a programmed apparatus execute a method of designing a progressive lens, the computer program including:
  (a) computer program code for processing an electronic file containing a reference progressive lens design having a peripheral design which is suitable for the wearer and design features with known values, said processing modifying the reference progressive lens design so as to provide a new progressive lens design in which at least one of the design features have been customised according to a wearer's preferences; and
  (b) computer program code for providing an electronic file containing the new progressive lens design; wherein the new progressive lens design has substantially the same peripheral design as the reference progressive lens design.

25. A computer program according to claim 24 wherein the design features having known values includes zone size balance, eye path inset and corridor length.

26. A computer program according to claim 24 wherein the reference progressive lens design is modified by morphing the reference progressive lens design's progressive surface power distribution.

27. A computer program according to claim 26 wherein morphing includes a plurality of morphing processes, each morphing process using a morphing function for a respective design feature.

28. A computer program according to claim 26 wherein said morphing includes rotating the nasal and temporal peripheral regions of the reference lens design in opposite directions.

29. A computer program according to claim 27 wherein each morphing process uses an elliptical coordinate system.

30. A computer program according to claim 26 wherein the reference progressive lens design is represented in the form of a surface curvature matrix and wherein the morphing of the reference progressive lens 20 design's progressive surface power distribution includes applying a morphing function to the surface curvature matrix so as to produce a target surface curvature distribution for the new progressive lens design.

31. A computer readable storage medium encoded with a computer program according to claim 24.

32. A programmed apparatus programmed with a computer program according to claim 24.

33. A computer program embodied in a tangible computer readable medium for making a programmed apparatus design a progressive addition lens design for a wearer, the computer program including:
  (a) computer program code for obtaining a reference progressive lens design selection the selected reference progressive lens design having:
    a peripheral design which is suitable for the wearer; and
    design features having known values, the design features including zone size balance, eye path inset and corridor length;
  (b) computer program code for obtaining the wearer's preferred value for one or more of the design features, said one or more of the design features including at least the zone size balance; and
  (c) computer program code for modifying the reference progressive lens design to obtain a new progressive lens design in which one or more of the design features have substantially the same value as the respective preferred value; wherein the peripheral design of the new progressive lens design is substantially identical to the peripheral design of the reference progressive lens design.

34. A computer readable storage medium encoded with a computer program according to claim 33.

35. A programmed apparatus programmed with a computer program according to claim 33.

* * * * *